United States Patent
Walch

(10) Patent No.: US 9,583,263 B2
(45) Date of Patent: Feb. 28, 2017

(54) METHOD FOR MANUFACTURING A CAPACITIVE STORAGE ELEMENT, STORAGE ELEMENT AND ITS USE

(75) Inventor: Bert Walch, Schwabach (DE)

(73) Assignee: ROBERT BOSCH GMBH, Stuttgart (DE)

(*) Notice: Subject to any disclaimer, the term of this patent is extended or adjusted under 35 U.S.C. 154(b) by 468 days.

(21) Appl. No.: 13/884,200

(22) PCT Filed: Sep. 21, 2011

(86) PCT No.: PCT/EP2011/066394
§ 371 (c)(1),
(2), (4) Date: Jul. 18, 2013

(87) PCT Pub. No.: WO2012/062507
PCT Pub. Date: May 18, 2012

(65) Prior Publication Data
US 2013/0301188 A1    Nov. 14, 2013

(30) Foreign Application Priority Data
Nov. 11, 2010    (DE) .................. 10 2010 043 748

(51) Int. Cl.
*H01G 4/12*    (2006.01)
*B60L 11/00*    (2006.01)
(Continued)

(52) U.S. Cl.
CPC ............. *H01G 4/12* (2013.01); *B60L 11/005* (2013.01); *B60L 11/1879* (2013.01);
(Continued)

(58) Field of Classification Search
CPC ........ H01G 4/0085; H01G 4/30; H01G 11/04; H01G 11/30; H01G 11/58; H01G 2/00;
(Continued)

(56) References Cited

U.S. PATENT DOCUMENTS 2,888,737 A * 6/1959 Robinson .................... 29/25.35
5,160,762 A   11/1992 Brand et al.
(Continued)

FOREIGN PATENT DOCUMENTS

| CN | 1653566 A | 8/2005 |
|---|---|---|
| CN | 101432831 A | 5/2009 |

(Continued)

OTHER PUBLICATIONS

International Search Report, International Application No. PCT/EP2011/066394, dated Jan. 18, 2012.

*Primary Examiner* — Dion R Ferguson
(74) *Attorney, Agent, or Firm* — Gerard Messina

(57) ABSTRACT

A method for manufacturing a capacitive storage element having a layer system on one side of a porous substrate, which is designed as a conductive substrate or has a conductive surface layer at least on the one side, the layer system having a layer sequence of a dielectric titanate layer and an electrically conductive layer. It is provided that to form a closed titanate layer having an adjustable minimum layer thickness, an external electrical field is applied in the direction of the layer sequence, and when the field is applied, a fluid containing titanate particles is applied to the substrate. A corresponding capacitive storage element and the use of a capacitive storage element as a storage element of an electrical energy storage unit for supplying energy to an electric drive or hybrid drive of a motor vehicle are also described.

7 Claims, 2 Drawing Sheets

(51) Int. Cl.
*B60L 11/18* (2006.01)
*H01G 11/52* (2013.01)

(52) U.S. Cl.
CPC ........... *H01G 4/1218* (2013.01); *H01G 11/52* (2013.01); *Y02T 10/7005* (2013.01); *Y02T 10/705* (2013.01); *Y02T 10/7022* (2013.01); *Y10T 29/435* (2015.01)

(58) Field of Classification Search
CPC ...... H01G 4/232; H01G 4/1227; H01G 7/026; H01G 4/12; H01G 4/1218
See application file for complete search history.

(56) References Cited

U.S. PATENT DOCUMENTS

| | | |
|---|---|---|
| 7,023,687 B2 | 4/2006 | Sterzel et al. |
| 2003/0214776 A1* | 11/2003 | Sterzel et al. ................ 361/329 |
| 2008/0297453 A1* | 12/2008 | Ray .................... H01L 27/3281 345/82 |
| 2009/0111009 A1* | 4/2009 | Goesmann et al. .......... 429/120 |
| 2009/0168299 A1 | 7/2009 | Thomas |

FOREIGN PATENT DOCUMENTS

| | | |
|---|---|---|
| CN | 101471181 A | 7/2009 |
| DE | 102 21 498 | 12/2003 |
| EP | 0 459 575 | 12/1991 |
| WO | WO 2007/125026 | 11/2007 |

\* cited by examiner

METHOD FOR MANUFACTURING A CAPACITIVE STORAGE ELEMENT, STORAGE ELEMENT AND ITS USE

FIELD

The present invention relates to a method for manufacturing a capacitive storage element having a layer system on one side of a porous substrate, which is designed as a conductive substrate or has a conductive surface layer at least on the one side, the layer system having a layer sequence of a dielectric titanate layer and an electrically conductive layer. The present invention also relates to a capacitive storage element for an electrical energy storage unit for supplying energy to an electric drive or a hybrid drive of a motor vehicle as well as its use as a storage element of an electrical energy storage unit for supplying energy to an electric drive or a hybrid drive of a motor vehicle.

BACKGROUND INFORMATION

German Patent Application No. DE 102 21 498 A1 describes a method for manufacturing a capacitor having an inert porous mold to which a first electrically conductive layer, a barium titanate layer, and then an electrically conductive layer are applied.

However, since the substrate, designed as a mold, of such a capacitive storage element is porous, the design of the titanate layer as a layer which is designed as a through-layer having a thickness which ensures adequate dielectric strength is not easy to achieve since the titanate is deposited preferably in the recesses in the porous substrate, while the protruding parts of the porous substrate remain uncovered by titanate or are only inadequately covered.

The minimal local thickness of the titanate layer, i.e., the thickness of this layer in its thinnest place, generally determines the dielectric strength of the capacitive storage element. Therefore, a corresponding local minimum thickness of the titanate layer is necessary for the particular use of the storage element. At the same time, however, the layered nature of the titanate layer should be ensured, i.e., the ratio of the layer thicknesses in the place having the greatest layer thickness to that having the smallest layer thickness should not be excessively high.

One preferred application of electrical storage elements such as electrochemical storage elements or capacitive storage elements is their use as storage elements of an electrical energy storage unit for supplying energy to an electric drive or a hybrid drive of a motor vehicle. An electrical energy storage unit is required for operating the electric drive train of an electric drive or a hybrid drive of a motor vehicle; the electrical energy storage unit has storage elements (storage cells) and, on the one hand, has a limited weight, so that it may be carried in the vehicle, and, on the other hand, is still able to store a sufficient amount of energy to ensure the usual range of a motor vehicle, such as of a passenger vehicle. Electrochemical energy storage units designed as rechargeable batteries or accumulators having lithium ion cells are considered to be the most effective energy storage units today. Today, the corresponding lithium ion batteries have an energy density of less than 0.2 kWh/kg. Additional selection criteria for selecting the type of energy storage unit include, in addition to the energy density, in particular the service life, the required top performance and the energy efficiency.

In addition, costs and environmental safety also play a crucial role in the selection of the type of energy storage unit.

Since the energy storage units for supplying energy to an electric drive or a hybrid drive of a motor vehicle are charged with a relatively high charging voltage of approximately 400 V to 600 V, the individual storage elements (storage cells) must have a corresponding dielectric strength (breakdown rating), depending on their wiring within the energy storage unit. With the aforementioned capacitive storage elements, this dielectric strength depends to a significant extent on the minimum local thickness of the titanate layer.

SUMMARY

In an example method according to the present invention, an external electrical field is applied in the direction of the layer sequence to form a closed titanate layer having an adjustable minimal layer thickness, and when the field is applied, a fluid containing titanate particles is applied to the substrate. The method according to the present invention may have the advantage that the titanate particles are concentrated in the protruding places (or in the protruding areas) of the porous substrate, since a higher field line density of the electrical field results there due to the shape of the substrate and its dielectric properties. Furthermore, the layered nature of the titanate layer may be ensured with relatively little effort through this method, i.e., it is possible to achieve a ratio, which is not excessively high, of the layer thicknesses in places having the greatest layer thickness and in places having the smallest layer thickness.

While applying the titanate particles dissolved in the fluid, the electrical field is applied transversely, in particular perpendicularly, to the plane of the layer(s). This should result in the titanate being concentrated to the greatest possible extent in the places of the greatest electrical field line density. This ensures a layered structure, which does not leave behind any critically thin places at the tips or elevated places of the substrate. As a result, the layer thickness of the titanate layer is applied with a sufficient uniformity with respect to the electrical field distribution. This in turn allows for the smoothest possible sliding of the substrate protrusions to achieve the high number of planes.

According to one preferred specific embodiment of the present invention, it is provided that the storage element is a storage element for an electrical energy storage unit for supplying energy to an electric drive or a hybrid drive of a motor vehicle, the layer thickness of the closed titanate layer being adjusted to a thickness D of 0.2 µm or more than 0.2 µm at all points in the layer. A storage element whose layer system has a titanate layer having a layer thickness D of 0.2 µm≤D≤2.0 µm is particularly well-suited for an electrical energy storage unit for supplying energy to an electric drive or a hybrid drive of a motor vehicle since it combines the properties of (a) dielectric strength for voltages of 400 V-600 V at (b) a high energy density, since the general equation for capacitance C is $C=E*A/d$.

According to another preferred specific embodiment of the present invention, it is provided that the forming closed titanate layer is then heated to 700° C. to 900° C. with continued application of the field. This heating creates a stable and long-lasting titanate layer.

In particular the sequence of the following method steps is provided: (i) supplying the porous substrate, then (ii)

forming the closed titanate layer on one side of the substrate and subsequently (iii) applying the electrically conductive layer to the titanate layer.

It is preferably provided that the substrate having the conductive surface layer is formed on one side by applying a conductive layer to one side of a porous body. The porous body is in particular a porous ceramic or activated carbon body. These materials intrinsically already have a sufficient number of suitably dimensioned pores. Alternatively, it is preferably provided that the conductive substrate is formed from a conductive porous ceramic body or from an activated carbon body. These materials intrinsically already have a sufficiently high conductivity.

In particular the titanate layer is a barium titanate layer. Energy densities of approximately 5.5 kWh/liter are achievable with a storage element having a barium titanate layer. This corresponds approximately to half the energy density of heating oil.

According to a preferred specific embodiment of the present invention, it is provided that the fluid is a volatile liquid, in particular an alcohol.

With an example capacitive storage element according to the present invention, the titanate layer is embodied as a closed titanate layer made of titanate particles, layer thickness D of the titanate layer being ≥0.2 µm at all points in the layer. A storage element whose layer system has a titanate layer having a layer thickness D of 0.2 µm≤D≤2.0 µm is particularly well-suited for an electrical energy storage unit for supplying energy to an electric drive or hybrid drive of a motor vehicle since it combines the properties of (a) dielectric strength for voltages of 400 V-600 V at (b) a high energy density.

The capacitive storage element is a storage element manufactured by the method defined above in particular. The titanate layer of such a storage element is characterized by a characteristically high particle density and configuration of these particles on the protruding areas (points) of the substrate.

The titanate layer is a barium titanate layer in particular. Energy densities of approximately 5.5 kWh/liter are achievable with a storage element having a barium titanate layer.

It is preferably provided that the substrate having the conductive surface layer on one side is a substrate formed by applying a conductive film to a porous body, in particular a porous ceramic or activated carbon body. These materials naturally have a sufficient number of suitably dimensioned pores. Alternatively, it is preferably provided that the conductive substrate is a conductive porous ceramic body or an activated carbon body. These materials intrinsically already have a sufficiently high conductivity.

The present invention also relates to a use of a capacitive storage element, in particular an aforementioned storage element as the storage element of an electrical energy storage unit for supplying energy to an electric drive or hybrid drive of a motor vehicle. It is provided that the capacitive storage element has a porous substrate and a layer system on one side of the porous substrate, the substrate is designed as a conductive substrate or has a conductive surface layer at least on the one side and the layer system has a layer sequence of a dielectric titanate layer and an electrically conductive layer, the titanate layer being designed as a closed titanate layer made of titanate particles whose layer thickness D is ≥0.2 µm at each point in the titanate layer.

If it is assumed that a 100 km driving range of a motor vehicle having an electric drive requires 15 kWh, then assuming a lithium ion battery as the electrical energy storage unit, one would need a battery weight of 75 kg/100 km. Thus, with a suitable vehicle having a range of 500 km, a battery weight of 350 kg would be needed. Furthermore, a lithium ion battery currently costs approximately 1,000 Euro per kWh. Such a rechargeable battery for a range of 500 km would thus cost approximately 75,000 Euro. An energy storage unit having the aforementioned capacitive storage element should be considerably less expensive per kWh.

The aforementioned energy storage units having capacitive storage elements are currently being used in the field of automotive engineering in energy storage units for storing and recuperating braking energy. Capacitive storage elements such as capacitors are less sensitive to rapid charge-and-discharge cycles than rechargeable batteries and also have a longer service life than rechargeable batteries. Energy densities of approximately 5.5 kWh/liter are achievable with a storage element having a barium titanate layer. A corresponding energy storage unit is thus very well-suited for permanently supplying energy to an electric drive or hybrid drive of a motor vehicle.

The present invention is explained below in greater detail on the basis of one example embodiment variant of the capacitive storage element.

DETAILED DESCRIPTION OF EXAMPLE EMBODIMENTS

Figure 1:
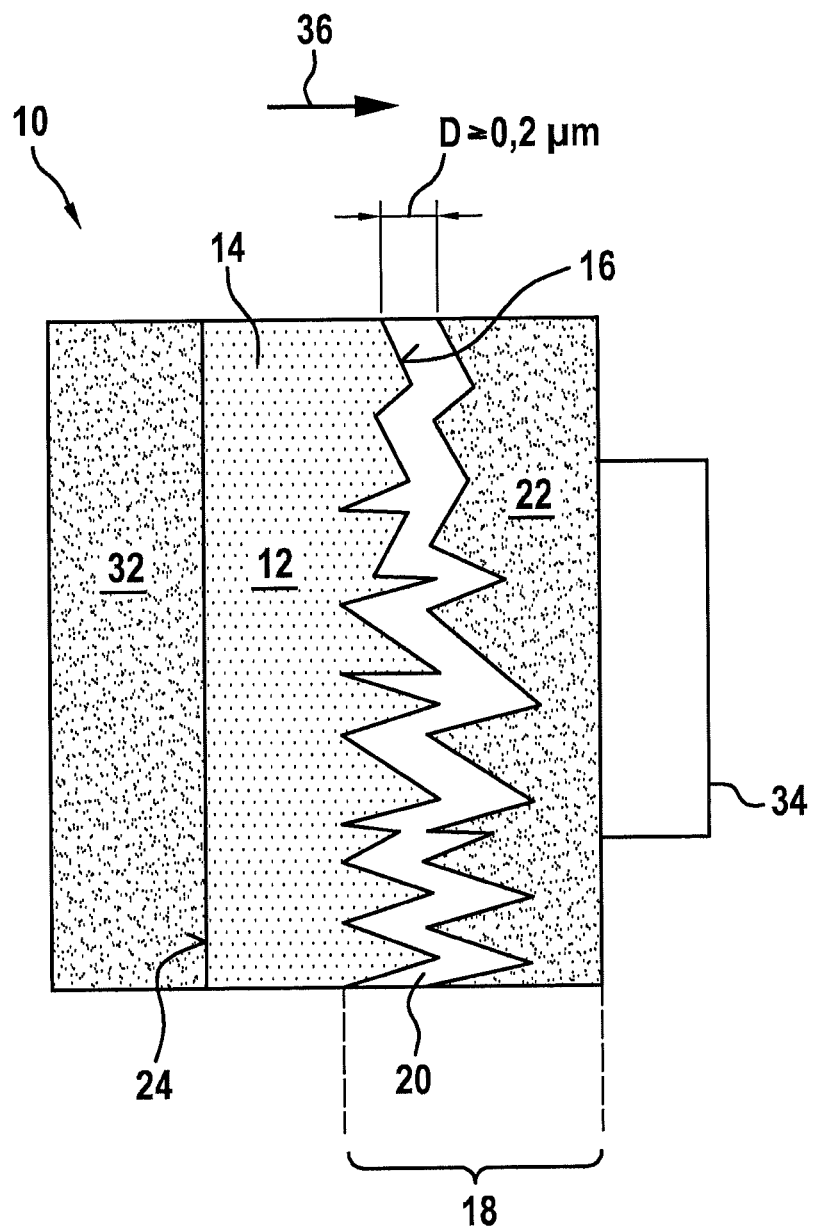
FIG. 1 shows the structure and layer sequence of a storage element according to a first preferred specific embodiment of the present invention in a schematic view.

FIG. 1 shows a capacitive storage element 10 having a porous substrate 12 and a layer system 18 on one side 16 of porous substrate 12. Porous substrate 12 of FIG. 1 is designed as a conductive substrate 14. Such a conductive porous substrate 14 is an activated carbon body, for example. Layer system 18 on one side 16 of substrate 12 is a layer system 18 having a layer sequence of a closed dielectric titanate layer 20 and an electrically conductive layer 22. The porous nature of substrate 12 is shown in the schematic view of FIGS. 1 and 2 only on the one side 16 facing dielectric titanate layer 20 and electrically conductive layer 22 but is also present in principle on the other side 24 of substrate 12 opposite the one side 16.

Figure 2:
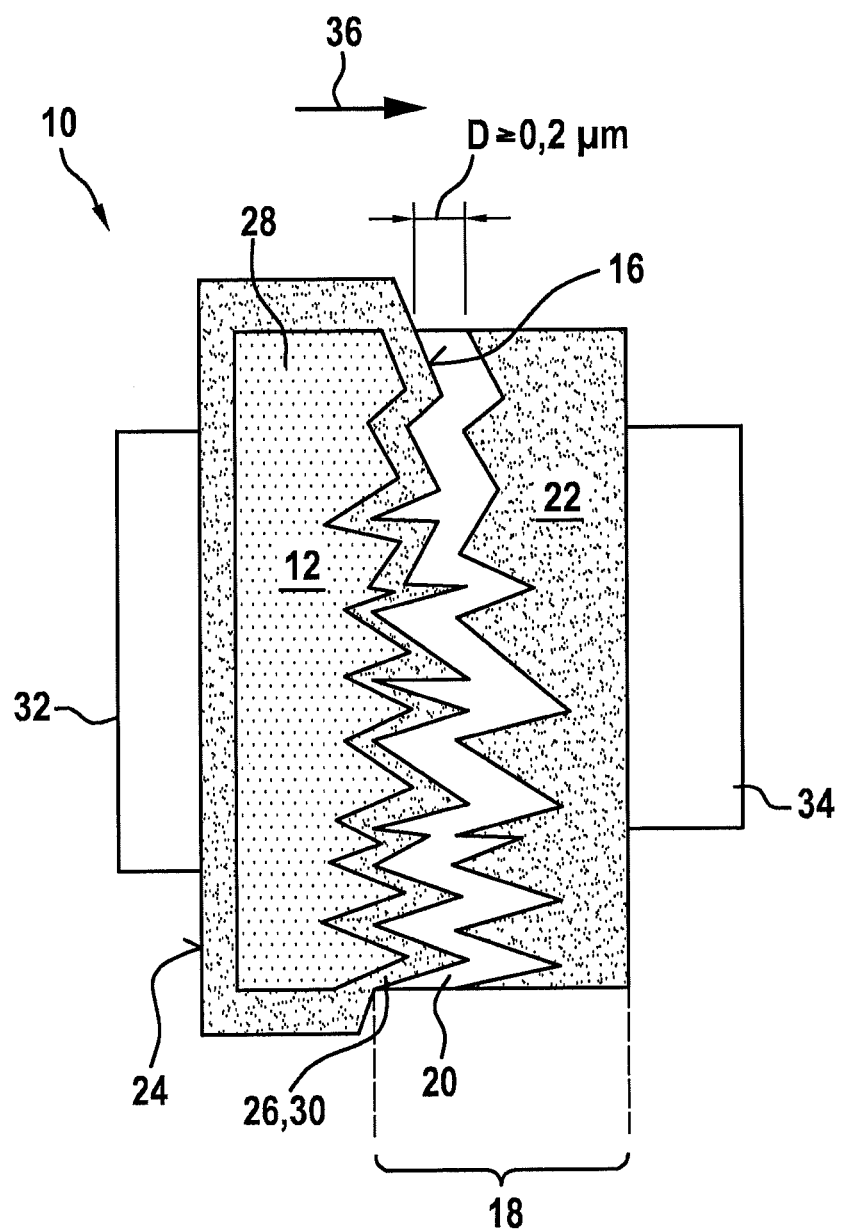
FIG. 2 shows the structure and layer sequence of a storage element according to a second preferred specific embodiment of the present invention in a schematic view.

FIG. 2 also shows a capacitive storage element 10 having a porous substrate 12 and a layer system 18 on one side 16 of porous substrate 12. However, porous substrate 12 of FIG. 2 is completely covered by a conductive surface layer 26 and is thus a substrate 12, which has a conductive surface layer 26 at least on one side 16. Such a substrate 12 having a conductive surface layer 26 at least on one side 16 includes, for example, a porous body 28 on whose side surface(s) a conductive film 30 is applied. Layer system 18 on one side 16 of substrate 12 is also a layer system 18 having a layer sequence of a closed dielectric titanate layer 20 and an electrically conductive layer 22.

Conductive porous substrate 14 and conductive surface layer 26 of substrate 12 having said surface layer 26 and also electrically conductive layer 22 are each electrically conductively connected to a corresponding electrode 32, 34 of storage element 10. Electrodes 32, 34 are used for electrically contacting capacitive storage element 10. Several storage elements 10 are interconnected in parallel and/or in series with an energy storage unit (not shown) via these electrodes 32, 34.

Electrically conductive layer 22 of layer system 18 and/or electrically conductive layer 26 of substrate 12 is/are in particular designed as metal layer(s). Porous substrate 12 is formed in particular from an intrinsically porous ceramic or an activated carbon body or it at least has such an intrinsically porous ceramic or such an activated carbon body. Closed titanate layer 20 is preferably a closed barium titanate layer (barium titanate: $BaTiO_3$). Barium titanate belongs to the group of electroceramics. Barium titanate is a ferroelectric having a pronounced hysteresis loop. Like all ferroelectrics, it has a high relative dielectric constant of more than 2,000. Alternatively, other titanates having a high dielectric constant may also be used.

Porous substrate 12 has a specific surface area (BET surface area) of 0.1 $m^2$/g to 20 $m^2$/g, preferably 0.5 $m^2$/g to 10 $m^2$/g, in particular preferably 1 $m^2$/g to 5 $m^2$/g, having a pore content of 10 vol % to 90 vol %, preferably 30 vol % to 85 vol %, in particular preferably 50 vol % to 80 vol %, and pore widths of 0.01 μm to 100 μm, preferably 0.1 μm to 30 μm, in particular preferably 1 μm to 10 μm. The pore content of porous substrate 12 is 10 vol % to 90 vol %.

Catalyst substrate materials which are suitable as porous ceramic bodies include, for example, those based on metal oxides such as aluminum oxide, silicon dioxide, titanium dioxide, zirconium dioxide, chromium oxide, or mixtures thereof, preferably aluminum oxide, silicon dioxide, titanium dioxide, zirconium dioxide or mixtures thereof, in particular preferably aluminum oxide, zirconium dioxide or mixtures thereof or carbides, preferably silicon carbide.

Titanate layer 20, designed as a barium titanate layer, has a relative dielectric constant of approximately 5,000.

Titanate layer 20 is composed of titanate particles and has a layer thickness D≥0.2 μm at all points. In contrast to the layer thickness of titanate layer 20, which should preferably be selected in the range of 0.2 μm, ≤D≤2.0 μm, the layer thicknesses of electrically conductive layer 22 and/or of electrically conductive surface layer 26 are selected to be considerably greater than 0.2 μm, in particular being selected to be greater than 2 μm.

The following steps are carried out in the method for manufacturing a capacitive storage element 10 according to one preferred specific embodiment: (i) providing a porous substrate 12, (ii) forming a closed titanate layer 20 on one side 16 of substrate 12, and (iii) applying an electrically conductive layer 22 to closed titanate layer 20.

To form closed titanate layer 20, an electrical field is applied over substrate 12 in the direction of the layer sequence (arrow 36), i.e., transversely to the planes of the layers, during the application of the titanate powder (grain size of the titanate particles preferably 10 nm-20 nm), preferably dissolved in alcohol. As a result, the titanate is concentrated as much as possible in the places of the greatest electrical field line density. This ensures a layered structure which does not leave behind any critically thin places in closed titanate layer 20 at the tips or elevated places in porous substrate 12. As a result, layer thickness D of titanate layer 20 is applied with sufficient uniformity with respect to the electrical field distribution. The smoothest possible sliding of the substrate protrusions is important here to achieve the high number of planes.

The external electrical field may be applied, for example, with the aid of an external plate capacitor, layer system 18 (or the layered structure of layer system 18 produced by then) including the plates of this plate capacitor being aligned in parallel or essentially in parallel to the layers of layer system 18 (not shown). In addition, the external electrical field may also be formed with the aid of a capacitor, which is formed by conductive substrate 12 at least on one side 16 and a, preferably planar, counter electrode.

Alternatively, a conductive fluid—as in electrolytic capacitors—may also be used to achieve a good perpendicular design of the electrical field, even in the pores. This fluid may then be washed out or evaporated after the stabilization process.

This layer system 18 (or the layered structure of layer system 18 produced by then) is then heated to 700° C. to 900° C. at inert-atmosphere, preferably while retaining the electrical field for the stabilization of titanate layer 20. Subsequently, conductive layer 22 is applied to titanate layer 20. This conductive layer 22 is a metal layer (for example, a copper layer) in particular. Electrically conductive layer 22 is applied (as in the application of the electrically conductive surface layer in the case of the storage element of FIG. 2) using a coating process, for example, using chemical vapor deposition (CVD) or physical vapor deposition (PVD).

Reeling of layer system 18 is not recommended. Capacitive storage element 10 is produced in a layered structure, as indicated previously.

What is claimed is:

1. A method for manufacturing a capacitive storage element having a layer system on one side of a porous substrate, which is designed as a conductive substrate, the layer system having a layer sequence of a dielectric titanate layer and an electrically conductive layer, the method comprising:
   supplying the porous substrate;
   forming a closed titanate layer having an adjustable minimal layer thickness on the one side of the substrate and directly in contact with the one side of the substrate by applying an external electrical field in a direction of the layer sequence transversely to the plane of the layer system, and when the field is applied, applying a fluid containing titanate particles to the substrate; and
   applying the electrically conductive layer to the closed titanate layer.

2. The method as recited in claim 1, wherein the storage element is a storage element for an electrical energy storage unit for supplying energy to an electric drive or hybrid drive of a motor vehicle, the layer thickness of the closed titanate layer being set at ≥0.2 μm at each point in the layer.

3. The method as recited in claim 1, wherein the forming closed titanate layer is heated to 700° C. to 900° C. while the field continues to be applied.

4. The method as recited in claim 1, wherein the conductive substrate is one of formed from a conductive porous ceramic body or an activated carbon body.

5. The method as recited in claim 1, wherein the titanate layer is a barium titanate layer.

6. The method according to claim 1, wherein the fluid is an alcohol.

7. A method, comprising:
   providing the capacitive storage element having a porous substrate and a layer system on one side of the porous substrate, the substrate being designed as a conductive substrate, and the layer system having a layer sequence of a dielectric titanate layer on the one side of the substrate and directly in contact with the one side of the substrate, and an electrically conductive layer provided on the titanate layer, the titanate layer being designed as a closed titanate layer made of titanate particles whose layer thickness is ≥0.2 μm at all points in the titanate layer, wherein the titanate layer is formed by applying an external electrical field in a direction of the layer sequence transversely to the plane of the layer system; and using the capacitive storage element as a storage element of an electrical energy storage unit for supplying energy to an electric drive or a hybrid drive of a motor vehicle.

\* \* \* \* \*